(12) United States Patent
Tanaka

(10) Patent No.: US 11,997,072 B2
(45) Date of Patent: May 28, 2024

(54) APPARATUS FOR DETECTING UNAUTHORIZED COMMUNICATION IN A NETWORK AND SEARCHING FOR A SUBSTITUTE DEVICE

(71) Applicant: HITACHI, LTD., Tokyo (JP)

(72) Inventor: Mayuko Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 292 days.

(21) Appl. No.: 17/536,146

(22) Filed: Nov. 29, 2021

(65) Prior Publication Data

US 2022/0210132 A1    Jun. 30, 2022

(30) Foreign Application Priority Data

Dec. 24, 2020 (JP) ................................ 2020-215466

(51) Int. Cl.
H04L 9/40 (2022.01)
(52) U.S. Cl.
CPC .......... *H04L 63/0281* (2013.01); *H04L 63/12* (2013.01); *H04L 63/1408* (2013.01); *H04L 63/145* (2013.01)
(58) Field of Classification Search
CPC ............. H04L 63/0281; H04L 63/1408; H04L 63/145; H04L 63/12
See application file for complete search history.

(56) References Cited

U.S. PATENT DOCUMENTS

| 11,595,419 | B2 | 2/2023 | Tanaka |
| 2013/0308442 | A1 | 11/2013 | Tamura |
| 2018/0173583 | A1* | 6/2018 | Braundmeier ........ G06F 11/079 |
| 2019/0205180 | A1* | 7/2019 | Macha .................. G06F 11/203 |
| 2021/0406367 | A1* | 12/2021 | Oka ...................... G06F 21/554 |

FOREIGN PATENT DOCUMENTS

| JP | 2017-111532 A | 6/2017 |
| JP | 2019-121811 | 7/2019 |
| WO | 2012/101785 | 8/2012 |

OTHER PUBLICATIONS

Japanese Office Action received in corresponding Japanese Application No. 2020-215466 dated Jan. 23, 2024.

\* cited by examiner

*Primary Examiner* — Theodore C Parsons
(74) *Attorney, Agent, or Firm* — MATTINGLY & MALUR, PC

(57) ABSTRACT

A communication monitoring and coping apparatus includes: a processor; a memory; an unauthorized communication detection unit that detects unauthorized communication in a network in which a plurality of devices are connected to communicate with each other and identifies a device involved in the detected unauthorized communication; a coping process determination unit that searches for another device that substitutes for the identified device and generates coping information, which is information of a process performed in place of the identified device, based on information on the network and information on each of processes performed by the plurality of devices; and a coping information transmission unit that transmits the generated coping information to an information processing apparatus that causes the other device to execute the process indicated by the coping information.

7 Claims, 11 Drawing Sheets

COMMUNICATION MONITORING AND COPING SYSTEM

FIG. 5

DEVICE INFORMATION TABLE 201

| DEVICE ID | DEVICE NAME | IP ADDRESS | ALTERNATIVE DEVICE | MODEL | DEVICE SPECIFICATION | REQUIREMENT | TASK ID |
|---|---|---|---|---|---|---|---|
| D01 | CONTROLLER 11A | 100.0.10.10 | NONE | CNT_02 | MEMORY 32 MB, LANGUAGES LD AND ST | MODEL CNTx, MEMORY OF 16 MB OR MORE, LANGUAGE ST | 10 |
| D02 | CONTROLLER 11B | 100.0.10.20 | D03 | CNT_01 | MEMORY 8 MB, LANGUAGE LD | MODEL CNTx, MEMORY OF 8 MB OR MORE, LANGUAGE LD | 20 |
| D03 | CONTROLLER 11C | 100.0.10.30 | NONE | CNT_01 | MEMORY 16 MB, LANGUAGE LD | MODEL CNTx, MEMORY OF 8 MB OR MORE, LANGUAGE LD | NONE |
| D04 | CONTROLLER 11D | 100.0.10.40 | NONE | CNT_03 | MEMORY 32 MB, LANGUAGE LD | MODEL CNTx, MEMORY OF 8 MB OR MORE, LANGUAGE LD | 30 |
| D21 | ACTUATOR 12A | 100.0.10.1 | NONE | AB_01 | - |  | 10 |
| D22 | ACTUATOR 12B | 100.0.10.2 | NONE | AC_01 | - |  | 20 |

WHITE COMMUNICATION TABLE 202

| COMMUNICATION ID | COMMUNICATION PROTOCOL | TRANSMISSION SOURCE IP ADDRESS | DESTINATION IP ADDRESS | TRANSMISSION SOURCE PORT NUMBER | DESTINATION PORT NUMBER |
|---|---|---|---|---|---|
| WT001 | tcp | 100.0.10.10 | 100.0.10.1 | * | 502 |
| WT002 | tcp | 100.0.10.1 | 100.0.10.10 | 502 | * |
| WT003 | tcp | 100.0.10.20 | 100.0.10.2 | * | 502 |
| WT004 | tcp | 100.0.10.2 | 100.0.10.20 | 502 | * |

TASK INFORMATION TABLE 203

| TASK ID | TASK NAME | OPERATION TIME | PRIORITY ORDER | TASK COMMUNICATION |
|---|---|---|---|---|
| 10 | TASK 10 | 9:00 – 17:00 | 1 | WT001, WT002 |
| 20 | TASK 20 | 1:00 – 6:00 | 2 | WT003, WT004 |
| 30 | TASK 30 | 9:00 – 17:00 | 3 | : |
|  |  |  |  |  |

CONTROL INFORMATION TABLE 204

| | |
|---|---|
| COMMUNICATION ID | WT001 |
| CONTROL PROTOCOL | modbus/tcp |
| CONTROL COMMAND | FUEL VALVE CONTROL |
| PARAMETER | OPEN, CLOSED |
| COMMUNICATION CYCLE | 100 ms |
| INFLUENCE DEGREE | HIGH |
| INFLUENCE DEGREE | LOW |

801
802
803
804
805
806

FIG. 9
COMMUNICATION MONITORING AND COPING PROCESS
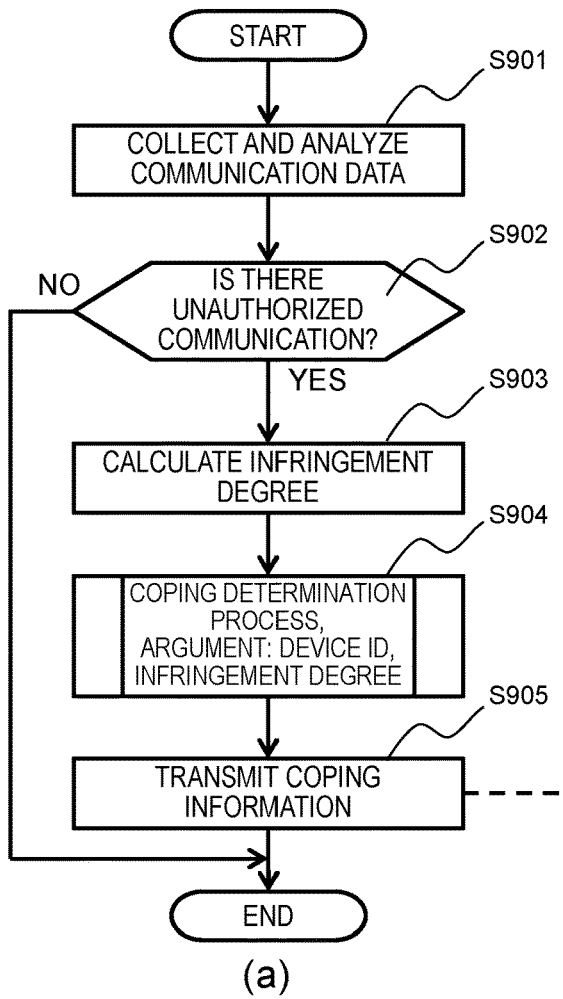
(a)
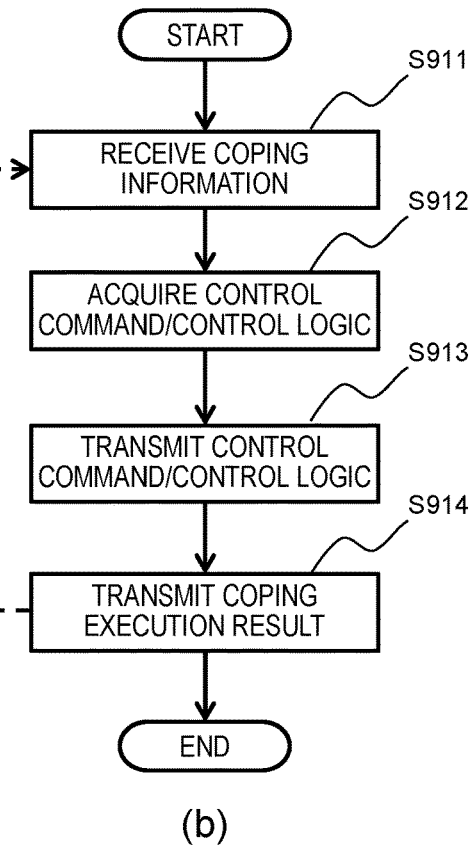
(b)
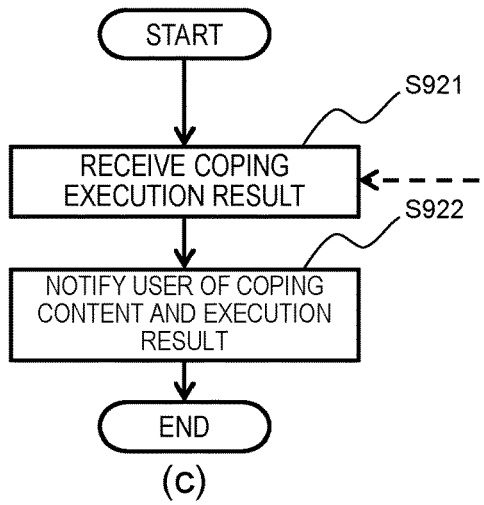
(c)

FIG. 10

INFRINGEMENT DEGREE DETERMINATION TABLE 205

|  |  | UNAUTHORIZED COMMUNICATION RATE | | |
|---|---|---|---|---|
|  |  | HIGH | MEDIUM | LOW |
| INFLUENCE DEGREE | HIGH | HIGH | HIGH | MEDIUM |
| | MEDIUM | HIGH | MEDIUM | LOW |
| | LOW | MEDIUM | LOW | LOW |

APPARATUS FOR DETECTING UNAUTHORIZED COMMUNICATION IN A NETWORK AND SEARCHING FOR A SUBSTITUTE DEVICE

CROSS-REFERENCE TO RELATED APPLICATIONS

This application claims priority based on Japanese patent application, No. 2020-215466 filed on Dec. 24, 2020, the entire contents of which are incorporated herein by reference.

BACKGROUND

The present invention relates to a communication monitoring and coping apparatus, a communication monitoring and coping method, and a communication monitoring and coping system.

In Society 5.0, introduction of IoT systems configured in cooperation with IoT devices has been promoted even in an industrial field. Accordingly, it is assumed that a cyber-attack on the industrial field expands in terms of the magnitude of the influence on the society and the like. When a security breach occurs in a certain device in a system, it is a basic measure to isolate the device from a network from the system.

For example, JP 2017-111532 A describes an integrated industrial system including: a safety instrumented system which is connected to a network; a detecting device which detects a cyber-attack from at least one of inside and outside to the integrated industrial system; and a safety controller which is a part of the safety instrumented system and takes a countermeasure of restricting at least some functions of a host device based on a detection result of the detecting device.

SUMMARY

In the system as disclosed in JP 2017-111532 A, however, the operation related to the device is stopped when a cyber-attack is detected, which affects the continuation of business (task). However, the system does not sufficiently have a configuration to cope with this, and thus, there is a problem that the continuation of the business (task) is likely to be hindered.

The present invention has been made in view of the above circumstances, and an object thereof is to provide a communication monitoring and coping apparatus, a communication monitoring and coping method, and a communication monitoring and coping system capable of coping a system in which unauthorized communication has occurred while ensuring availability and safety.

One aspect of the present invention for solving the above problem is a communication monitoring and coping apparatus including: a processor; a memory; an unauthorized communication detection unit that detects unauthorized communication in a network in which a plurality of devices are connected to communicate with each other and identifies a device involved in the detected unauthorized communication; a coping process determination unit that searches for another device that substitutes for the identified device and generates coping information, which is information of a process performed in place of the identified device, based on information on the network and information on each of processes performed by the plurality of devices; and a coping information transmission unit that transmits the generated coping information to an information processing apparatus that causes the other device to execute the process indicated by the coping information.

In addition, another aspect of the present invention for solving the above problem is a communication monitoring and coping method for causing an information processing apparatus to execute: an unauthorized communication detection process of detecting unauthorized communication in a network in which a plurality of devices are connected to communicate with each other and identifying a device involved in the detected unauthorized communication; a coping process determination process of searching for another device that substitutes for the identified device and generating coping information, which is information of a process performed in place of the identified device, based on information on the network and information on each of processes performed by the plurality of devices; and a coping information transmission process of transmitting the generated coping information to an information processing apparatus that causes the other device to execute the process indicated by the coping information.

In addition, still another aspect of the present invention for solving the above problem is a communication monitoring and coping system including: a communication monitoring and coping apparatus that includes a processor, a memory, an unauthorized communication detection unit that detects unauthorized communication in a network in which a plurality of devices are connected to communicate with each other and identifies a device involved in the detected unauthorized communication, a coping process determination unit that searches for another device that substitutes for the identified device and generates coping information, which is information of a process performed in place of the identified device, based on information on the network and information on each of processes performed by the plurality of devices, and a coping information transmission unit that transmits the generated coping information to an information processing apparatus that causes the other device to execute the process indicated by the coping information; and a coping execution apparatus including a processor, a memory, a coping information reception unit that receives the coping information, and a control command transmission unit that transmits, to the other device, information for causing the other device to execute the process indicated by the coping information based on the received coping information.

According to the present invention, it is possible to cope with the system in which unauthorized communication has occurred while ensuring the availability and safety.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a view illustrating an example of a device information table;

FIG. 6 is a view illustrating an example of a white communication table;

FIG. 7 is a view illustrating an example of a task information table;

FIG. 8 is a view illustrating an example of a control information table;

FIG. 9 is a flowchart illustrating an example of communication monitoring and coping process;

FIG. 10 is a view illustrating an example of an infringement degree determination table;

DETAILED DESCRIPTION OF THE EMBODIMENTS

The present invention relates to "Cyber Physical Security Compatible with IoT Society", which is a second term of "Cross-ministerial Strategic Innovation Promotion Program" (SIP) of the Council for Science, Technology and Innovation, promoted by the New Energy and Industrial Technology Development Organization (NEDO).

Hereinafter, an embodiment of the present invention will be described with reference to drawings. Incidentally, the embodiment to be described hereinafter do not limit the present invention according to the claims, and further, all of the elements described in the embodiment and combinations thereof are not necessarily indispensable for the solution of the invention.

<Communication Monitoring and Coping System>

Figure 1:
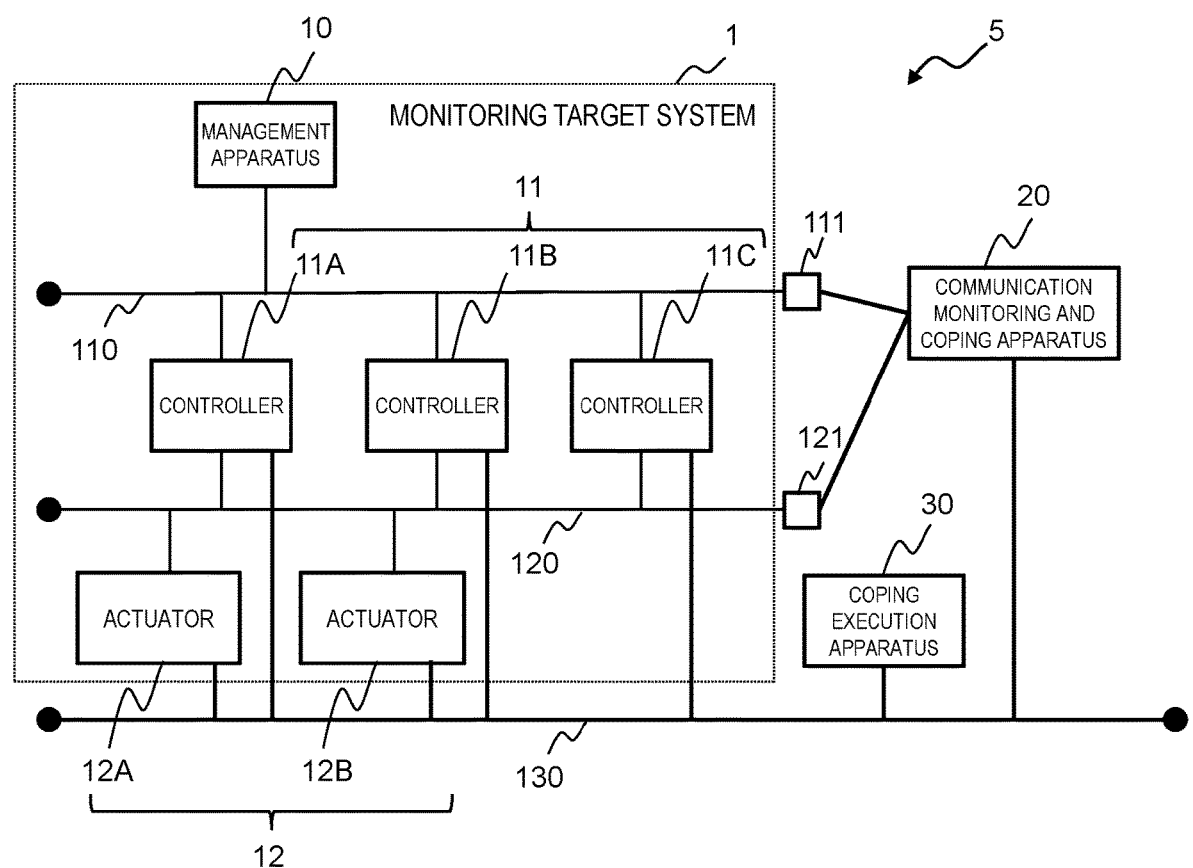
FIG. 1 is a diagram illustrating a configuration example of a communication monitoring and coping system according to the present embodiment.

FIG. 1 is a diagram illustrating a configuration example of a communication monitoring and coping system according to the present embodiment. A communication monitoring and coping system 5 includes a monitoring target system 1, a communication monitoring and coping apparatus 20, and a coping execution apparatus 30.

The communication monitoring and coping system 5 performs a predetermined task, and can continue the task and maintain the availability and safety of the monitoring target system 1 by switching a device in the monitoring target system 1 that has suffered a security breach to another device when detecting the security breach (unauthorized communication) of the monitoring target system 1.

The monitoring target system 1 is an Internet of Things (IoT) system, and includes a management apparatus 10, one or a plurality of controllers 11 (11A to 11C), and one or a plurality of actuators 12 (12A and 12B) (hereinafter, these devices will be collectively referred to simply as "devices").

The management apparatus 10 and each of the controllers 11 are connected by a first network 110 to communicate with each other, and each of the controllers 11 and each of the actuators 12 are connected by a second network 120 to communicate with each other. In a case where the monitoring target system 1 is an industrial IoT system, the first network 110 is, for example, a control network, and the second network 120 is, for example, a field network.

The management apparatus 10 monitors the entire operation of the monitoring target system 1 via the first network 110. The management apparatus 10 is, for example, a system monitoring server or an engineering workstation (EWS) that changes or updates the logic of a control program running in the controller 11.

The controllers 11 operate the respective actuators 12 connected via the second network 120 in accordance with a command received from the management apparatus 10 via the first network 110, thereby performing predetermined tasks. The controller 11 is, for example, a programmable logic controller (PLC) or the like that sets operation setting values, such as the rotational speed of a motor in the actuator 12 or collects information output by the actuator 12 in accordance with a command of a control server.

The actuator 12 performs the predetermined task based on a command from the controller 11. The actuator 12 is, for example, an actuator that actually moves a valve, a motor, an electric motor, or the like in accordance with the setting value set based on the command from the controller 11, or a sensor that measures a temperature, a flow rate, a pressure, or the like and outputs a measurement value.

Next, the communication monitoring and coping apparatus 20 is connected to the monitoring target system 1 via mirror ports 111 and 121 to communicate with each other. Note that the mirror ports 111 and 121 are devices that transmit copies of communication information flowing through the first network 100 and the second network 120 of the monitoring target system 1 to the communication monitoring and coping apparatus 20.

The communication monitoring and coping apparatus 20 collects and analyzes communication data (packets) in the first network 110 and the second network 120 of the monitoring target system 1 via the mirror ports 111 and 121, thereby detecting unauthorized communication being performed in the first network 110 or the second network 120. Then, the communication monitoring and coping apparatus 20 analyzes the detected unauthorized communication to determine another device (hereinafter, referred to as a coping target device) that performs processing on behalf of the device (hereinafter, referred to as a coping-required device) involved in the unauthorized communication, determines a process (coping process) to be performed by the coping target device based on the priority or the like of a task that the determined coping target device is in charge of, and generates information (coping information) indicating the content of the coping.

The coping execution apparatus 30 is connected to the monitoring target system 1 and the communication monitoring and coping apparatus 20 via the coping network 130 to communicate with each other. The coping execution apparatus 30 has processing authority with respect to the respective devices of the monitoring target system 1. The coping execution apparatus 30 receives the coping information from the communication monitoring and coping apparatus 20, converts the received coping information into a control command or a control logic program that can be executed or processed by the coping target device, and transmits the converted control command or control logic program to the coping target device, thereby causing the coping target device to execute the coping process. As a result, it is possible to safely continue the task in the monitoring target system 1 even when the unauthorized communication occurs.

Note that the first network 110, the second network 120, and the coping network 130 can be configured as, for example, wired or wireless communication networks such as a local area network (LAN), a wide area network (WAN), the Internet, and a dedicated line.

Figure 2:
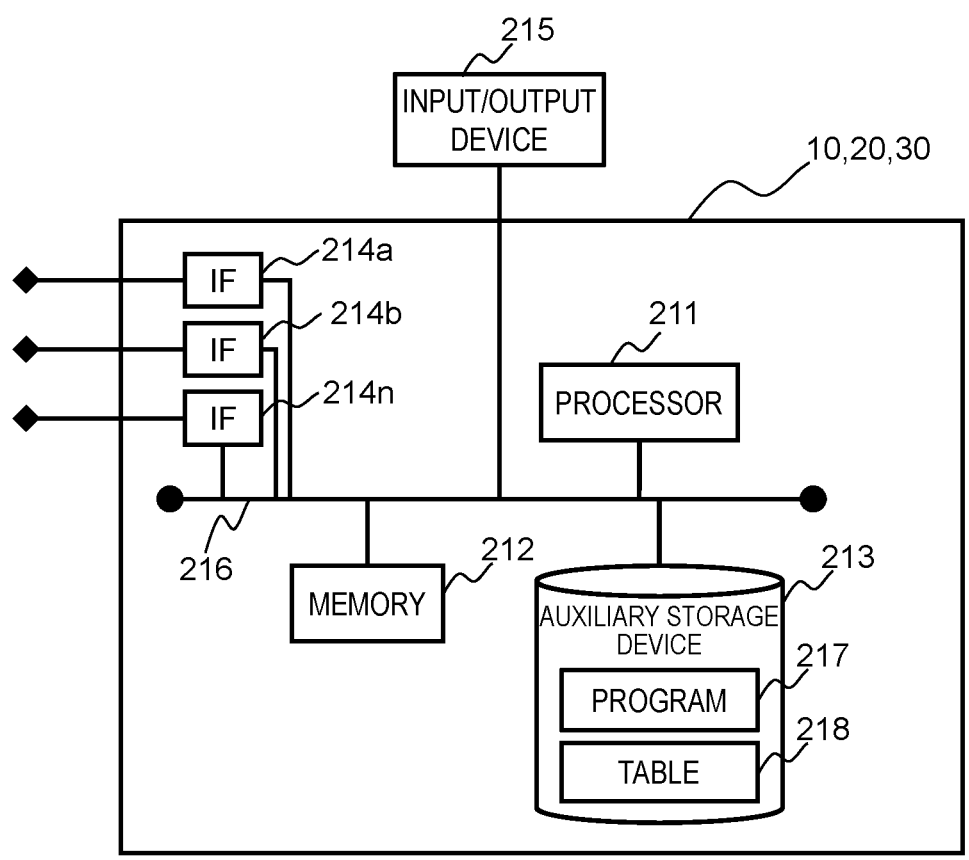
FIG. 2 is a block diagram illustrating a hardware configuration example of each information processing apparatus according to the present embodiment.

FIG. 2 is a block diagram illustrating a hardware configuration example of each of information processing apparatuses (the management apparatus 10, the communication monitoring and coping apparatus 20, and the coping execution apparatus 30) according to the present embodiment. Each of the information processing apparatuses includes a processor 211, a memory 212, an auxiliary storage device 213, a plurality of interfaces (IF) 214 (214a, 214b, . . . , and 214n), and an input/output device 215 connected to each other via an internal communication line 216 such as a bus.

The processor 211 is, for example, a central processing unit (CPU), and executes various programs loaded into the memory 212 to implement various functions of each of the information processing apparatuses. Note that the memory 212 includes, for example, a ROM which is a nonvolatile storage element and a RAM which is a volatile storage element. The ROM stores an invariable program (for example, BIOS) and the like. The RAM is, for example, a high-speed and volatile storage element such as a dynamic random access memory (DRAM), and temporarily stores a program to be executed by the processor 211 and data to be used at the time of executing the program.

The auxiliary storage device 213 is, for example, a nonvolatile storage device, such as a magnetic storage device (HDD) and a flash memory (SSD), and stores a program to be executed by the processor 211 and data to be used at the time of executing the program. That is, a program 217 read from the auxiliary storage device 213 is loaded into the memory 212 and then executed by the processor 211. The whole or a part of the program 217 or a table 218 stored in the memory 212 may be stored in the auxiliary storage device 213, or the whole or a part of the program 217 or the table 218 stored in the auxiliary storage device 213 may be stored in the memory 212.

The whole or a part of the above program and data may be stored in advance in the auxiliary storage device 213, or may be stored in the auxiliary storage device 213 via an I/F (not illustrated) included in each of the information processing apparatuses, from another device including a non-transitory storage device connected via a network, or from a non-transitory storage medium as necessary.

The IF 214 is a network interface device that controls communication with other apparatuses according to a predetermined protocol, and each of the IFs 214 corresponds to each network of the monitoring target system 1. The IF 214 collects communication packets of the monitoring target system 1 that includes a plurality of networks.

The input/output device 215 is a device that receives an input from a user and outputs an execution result of the program 217 in a format that can be visually recognized by the user, and is, for example, a keyboard, a mouse, and/or a display. Note that the input/output device 215 may be connected to the outside of the information processing apparatus.

<Communication Monitoring and Coping Apparatus>

Figure 3:
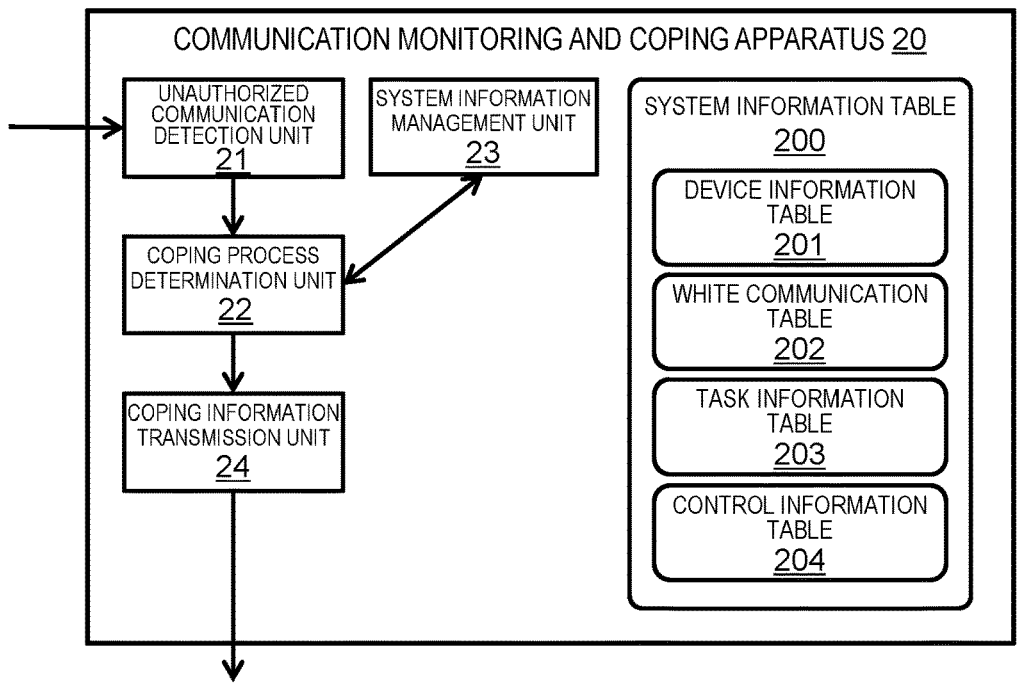
FIG. 3 is a block diagram illustrating exemplary functions of a communication monitoring and coping apparatus.

FIG. 3 is a block diagram illustrating exemplary functions of the communication monitoring and coping apparatus 20. The communication monitoring and coping apparatus 20 collects and analyzes communication data of the monitoring target system 1 to detect unauthorized communication. In addition, the communication monitoring and coping apparatus 20 determines the coping target device to perform processing instead of the coping-required device from the content of the detected unauthorized communication, the configuration of the monitoring target system 1, and the like. At this time, the communication monitoring and coping apparatus 20 determines a specific measure for safely continuing a task of the monitoring target system 1 based on the priority of a task related to a process that the coping target device is in charge of, an operation state of the monitoring target system 1, and the like.

That is, the communication monitoring and coping apparatus 20 stores each functional unit (program) of an unauthorized communication detection unit 21, a coping process determination unit 22, a system information management unit 23, and a coping information transmission unit 24.

In addition, the communication monitoring and coping apparatus 20 holds a system information table 200 including a device information table 201, a white communication table 202, a task information table 203, and a control information table 204.

The unauthorized communication detection unit 21 collects communication packets flowing through the first network 110 and the second network 120 of the monitoring target system 1 via the IFs 214. Then, the unauthorized communication detection unit 21 analyzes the collected communication packets, and acquires (1) header information (IP addresses, communication protocols, port numbers, and the like of a data transmission source device and a data transmission destination device), and (2) a control command and (3) a parameter included in payload. In addition, the unauthorized communication detection unit 21 generates (4) statistical information such as a change in the number of communications regarding the control command.

Then, the unauthorized communication detection unit 21 compares a specification of the monitoring target system 1 indicated by the system information table 200, which will be described later, with pieces of information (hereinafter, referred to as analysis information) described in (1) to (4) above to determine whether unauthorized communication is being performed in the monitoring target system 1, and transmits unauthorized communication information including information on the unauthorized communication and a detected event to the coping process determination unit 22 when determining that the unauthorized communication is being performed.

The coping process determination unit 22 determines a coping target device based on the unauthorized communication information and information on the respective devices of the monitoring target system 1. Then, the coping process determination unit 22 determines a coping process for safely continuing a task of the monitoring target system 1 based on the priority of a task (process to be executed) that the coping target device is in charge of, requirements or operation states of the respective devices of the monitoring target system 1, and the like.

The system information management unit 23 manages the system information table 200 to be described later.

The coping information transmission unit 24 generates coping information based on the coping process determined by the coping process determination unit 22 and transmits the generated coping information to the coping execution apparatus 30.

<Coping Execution Apparatus>

Figure 4:
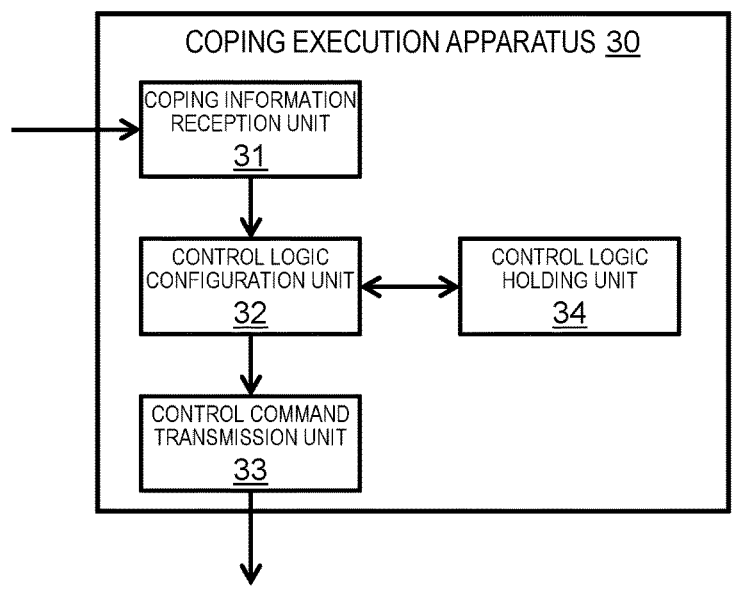
FIG. 4 is a block diagram illustrating exemplary functions of a coping execution apparatus.

FIG. 4 is a block diagram illustrating exemplary functions of the coping execution apparatus 30. The coping execution apparatus 30 receives coping information from the communication monitoring and coping apparatus 20 and transmits a control command or a control logic program to a coping target device for which the coping execution apparatus 30 has the processing authority based on the received coping information. Note that the control logic is a control configuration of a sequence of a controller implemented by executing predetermined processing and calculation.

The coping execution apparatus 30 stores each functional unit (program) of a coping information reception unit 31, a control logic configuration unit 32, a control command transmission unit 33, and a control logic holding unit 34.

The coping information reception unit 31 receives the coping information generated by the communication monitoring and coping apparatus 20 via the IF 214 and transmits the coping information to the control logic configuration unit 32. In addition, the coping information reception unit 31 returns information of a result of a process of the coping target device, which has executed the process based on the coping information to, the communication monitoring and coping apparatus 20.

The control logic configuration unit 32 acquires a control command or a control logic program, which corresponds to the coping information and is to be transmitted to the coping target device, from the control logic holding unit 34, and transmits the acquired control command or control logic program to the control command transmission unit 33.

In the present embodiment, the coping target device includes another device (hereinafter, referred to as a proxy device) that is allocated in advance to each device and performs a process on behalf of the device when unauthorized communication occurs, and a still another device (hereinafter, referred to as an alternative device) that is dynamically allocated at the time of detecting unauthorized communication and performs the process on behalf of the device.

The control command transmission unit 33 causes the coping target device or the coping-required device to execute a control process by transmitting the control command and the control logic program acquired by the control logic configuration unit 32. Thereafter, the control command transmission unit 33 receives information on an execution result of the control process from the coping target device or the coping-required device, and transmits the received information to the coping information reception unit 31.

The control logic holding unit 34 stores control logic programs and control commands corresponding to the respective devices in the monitoring target system 1.

Here, the device information table 201, the white communication table 202, the task information table 203, and the control information table 204 constituting the system information table 200 will be described.

<Device Information Table>

FIG. 5 is a view illustrating an example of the device information table 201. The device information table 201 includes: a device ID 501 that uniquely identifies each device in the monitoring target system 1; a device name 502 of the device; an IP address 503 of the device; an alternative device 504 that is the other device that continues a task by performing a process in substitute for the device in a case where there is an abnormality in the device; a model 505 of the device according to the device ID 501; a device specification 506 of the device; a requirement 507 (including one or a plurality of items) of an execution environment requested by a control logic program and a control command operating in the device; and a task ID 508 of a task that the device is currently in charge of.

<White Communication Table>

FIG. 6 is a view illustrating an example of the white communication table 202. The white communication table 202 is information on communication in the monitoring target system 1, and includes: a communication ID 601 that uniquely identifies communication; a communication protocol 602 of the communication; a transmission source IP address 603 which is an IP address of a transmission source device of data related to the communication; a destination IP address 604 which is an IP address of a transmission destination device of data related to the communication; a transmission source port number 605 which is a port number of the transmission source device of the data related to the communication; and a destination port number 606 which is a port number of the transmission destination device of the data related to the communication. These pieces of information may be a specific numerical value or may be information indicating a certain range. In the white communication table 202 of the present embodiment, "*" is set when no value is designated for the transmission source port number 605 and the destination port number 606.

<Task Information Table>

FIG. 7 is a view illustrating an example of the task information table 203. The task information table 203 is information on a task performed in the monitoring target system 1, and includes: a task ID 701 that uniquely identifies a task performed in the monitoring target system 1; a task name 702 of the task; an operation time 703 indicating a time zone in which the task is executed; a priority order column 704 of the task; and task communication 705 which is a list of communication (list of communication IDs) for performing the task.

In the task information table 203 of the present embodiment, regarding the priority order of the task, 1 indicates the highest priority order, and a larger value indicates a lower priority order.

<Control Information Table>

FIG. 8 is a view illustrating an example of the control information table 204. The control information table 204 is a table in which a control protocol, a parameter, and the like of each communication used in a task are stored, and includes: a communication ID 801 of each communication; a control protocol 802 of the communication; a control command 803 of the communication; a parameter 804 in the communication; a communication cycle 805 of the communication; and an influence degree 806 of the communication. In the present embodiment, "*" is set for the communication cycle 805 when there is no cycle.

The influence degree 806 is a parameter representing the degree of continuity and safety (degree of strength of tampering) of a task affected by the monitoring target system 1 when unauthorized communication has been performed, for example, when a control command in communication is stopped or rapidly increased or an unauthorized parameter value is set in the control command. In the present embodiment, it is assumed that three stages of high, medium, and low are set as the influence degree 806. Here, "high" indicates that the influence is great, for example, there is a possibility that a task is stopped for several days or human life is threatened, "low" indicates that the influence is minor and limited, and "medium" indicates that the influence is intermediate.

<Communication Monitoring and Coping Process>

Next, a process performed by the communication monitoring and coping system 5 will be described.

FIG. 9 is a flowchart illustrating an example of a communication monitoring and coping process of detecting unauthorized communication of monitoring target system 1 and coping with the unauthorized communication. The communication monitoring and coping process is executed, for example, at a predetermined timing (for example, at predetermined time or a predetermined time interval) or when there is a predetermined input from the user.

First, the communication monitoring and coping apparatus 20 detects unauthorized communication of the monitoring target system 1, determines a coping process, and transmits coping information to the coping execution apparatus 30 (a: S901 to S905).

That is, first, the unauthorized communication detection unit 21 collects and analyzes information on the network of the monitoring target system 1 (S901), and determines whether there is unauthorized communication in the monitoring target system 1 (S902).

Specifically, the unauthorized communication detection unit 21 acquires packets of the first network 110 and the second network 120 of the monitoring target system 1 for a predetermined time, and determines whether analysis information generated based on the acquired packets (hereinafter, referred to as an acquisition packet) matches the content (content of the communication protocol 602, the transmission source IP address 603, the destination IP address 604, the transmission source port number 605, and the destination port number 606) of records of the white communication table 202. When there is no matching record, the unauthorized communication detection unit 21 determines that there is unauthorized communication in the monitoring target system 1 assuming that unexpected communication is being performed.

On the other hand, when there is a matching record, the unauthorized communication detection unit 21 determines whether the acquisition packet is transmitted and received at correct timings based on the task information table 203. For example, the unauthorized communication detection unit 21 acquires the content of the communication ID 601 of the record whose content has matched as described above, and acquires the operation time 703 of the record of the task information table 203 in which the acquired communication ID 601 is registered in the task communication 705. The unauthorized communication detection unit 21 determines whether the current time corresponds to a time zone indicated by the acquired operation time, and determines that there is unauthorized communication in the monitoring target system 1 assuming that a task related to the acquisition packet is being performed at a timing outside the original task time when the current time does not correspond to the time zone indicated by the operation time, On the other hand, when the current time corresponds to the operation time, the unauthorized communication detection unit 21 determines whether the content of the acquisition packet is information in a proper range based on the control information table 204. For example, the unauthorized communication detection unit 21 acquires information (the control protocol 802, the control command 803, the parameter 804, the communication cycle 805, and the influence degree 806) of records in the control information table 204 in which the content of the acquired communication ID 601 is registered in the communication ID 801. The unauthorized communication detection unit 21 determines whether the content of the acquisition packet conforms to the acquired information, and determines that there is unauthorized communication in the monitoring target system 1 when the content of the acquisition packet does not conform to the acquired information.

In this manner, when it is determined that there is unauthorized communication in the monitoring target system (S902: YES), the unauthorized communication detection unit 21 identifies a device (coping-required device) involved in the unauthorized communication based on the content of the acquisition packet. For example, the unauthorized communication detection unit 21 identifies an IP address of a device as a transmission source or a transmission destination of data included in the acquisition packet. Then, the unauthorized communication detection unit 21 executes a process in S903 to be described later.

On the other hand, when the unauthorized communication detection unit 21 determines that there is no unauthorized communication in the monitoring target system (S902: NO), the communication monitoring and coping process ends.

In S903, the unauthorized communication detection unit 21 calculates an infringement degree as a parameter indicating the magnitude of influence of the unauthorized communication identified in S902 on the monitoring target system 1.

For example, the unauthorized communication detection unit 21 calculates the infringement degree based on a type of a control command related to unauthorized communication and the occurrence frequency of the unauthorized communication. Specifically, first, the unauthorized communication detection unit 21 acquires an influence degree of the control command related to the acquisition packet from influence degree 806 of control information table 204. In addition, the unauthorized communication detection unit 21 calculates an unauthorized communication rate (which will be described later) in the acquisition packet. Then, the unauthorized communication detection unit 21 identifies an infringement degree corresponding to the acquired influence degree and the calculated unauthorized communication rate by referring to an infringement degree determination table 205 to be described later.

In the present embodiment, the unauthorized communication rate is an occurrence rate of invalid communication per unit time in an acquisition packet, and is set to "high" at 50% or more, "medium" at 10% or more and less than 50%, and "low" at less than 10%.

FIG. 10 is a view illustrating an example of the infringement degree determination table 205. The infringement degree determination table 205 is a table that stores a correspondence relationship among an unauthorized communication rate 901 (high, medium, and low), an influence degree 902 (high, medium, and low), and an infringement degree 903 (high, medium, land ow).

Next, as illustrated in S904 of FIG. 9, the coping process determination unit 22 executes a coping determination process of determining a coping process based on the infringement degree calculated in S903. Details of the coping determination process will be described later.

The coping information transmission unit 24 creates coping information based on the coping process determined by the coping determination process and transmits the created coping information to the coping execution apparatus 30 (S905). Note that the coping information includes, for example, a device ID of a coping target device and the content of the coping process.

Thereafter, the coping execution apparatus 30 causes the coping target device to execute the coping process based on the coping information received from the communication monitoring and coping apparatus 20 (b: S911 to S914).

That is, first, the coping information reception unit 31 receives the coping information from the communication monitoring and coping apparatus 20 (S911).

The control logic configuration unit 32 acquires control commands and control logic programs of the respective coping target devices or coping-required devices indicated by the coping information (S912). Then, the control command transmission unit 33 transmits the respective control commands and the respective control logic programs acquired in S912 to the respective coping target devices or coping-required devices (S913).

Thereafter, the control logic configuration unit 32 waits for reception of information on execution results of the control commands and the control logic programs from the respective coping target devices or coping-required devices. When receiving the information on the execution results, the control logic configuration unit 32 transmits the received information to the communication monitoring and coping apparatus 20 (S914).

Next, the communication monitoring and coping apparatus 20 displays information on the coping process and the execution result thereof on a screen based on the information received from the coping execution apparatus 30 (c: S921 to S922).

That is, when receiving the information from the coping execution apparatus 30 (S921), the coping information transmission unit 24 displays the content of the received information on the input/output device 215 to be presented to the user (S922). The communication monitoring and coping process ends as above.

Next, details of the coping determination process S904 will be described.

<Coping Determination Process>

Figure 11:
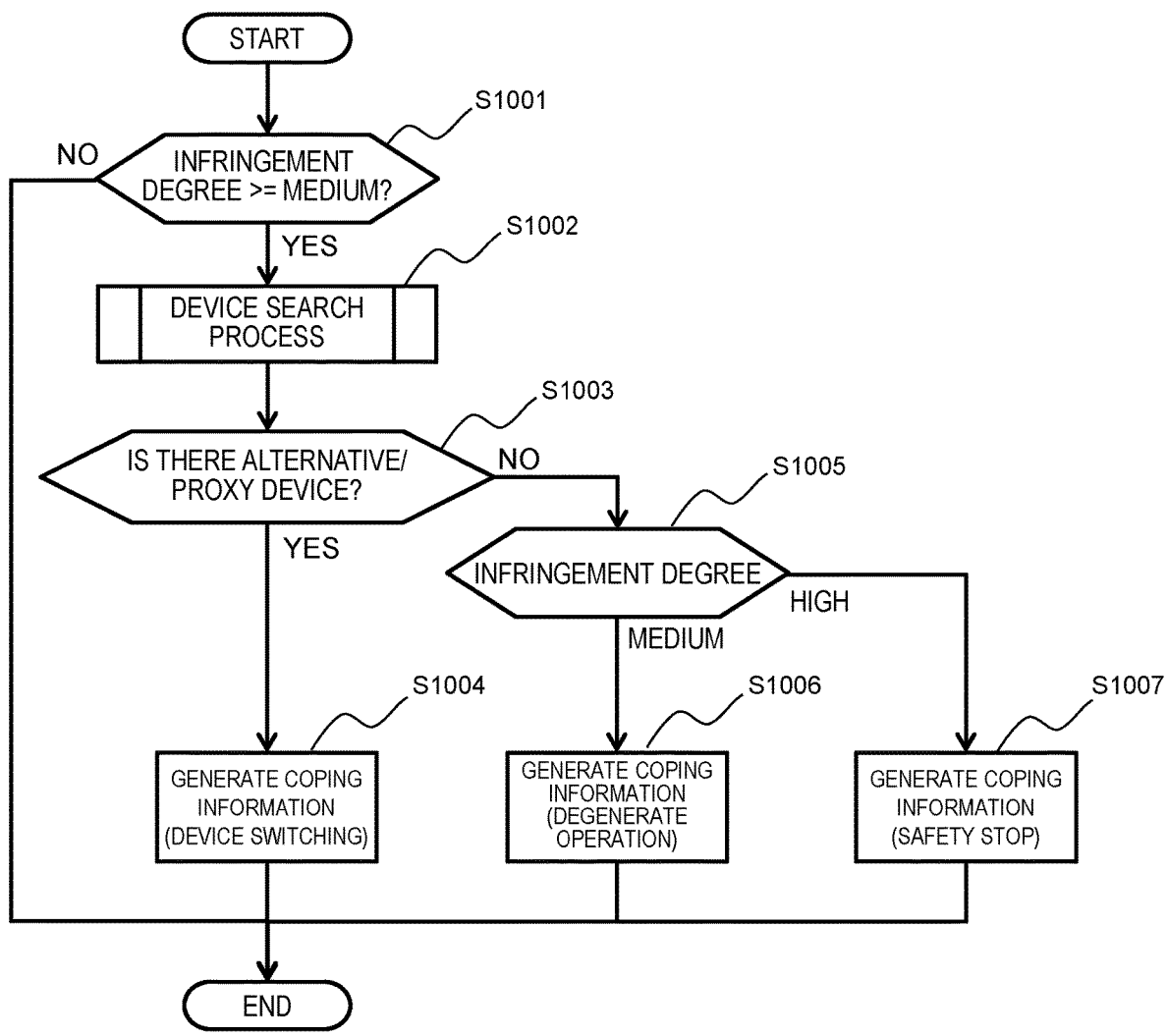
FIG. 11 is a flowchart illustrating an example of a coping determination process.

FIG. 11 is a flowchart illustrating an example of the coping determination process.

The coping process determination unit 22 of the communication monitoring and coping apparatus 20 determines whether the infringement degree calculated in S903 is high enough to require a coping process (S1001). For example, the coping process determination unit 22 determines whether the infringement degree calculated in S903 is "medium" or higher. This is because the availability of the monitoring target system 1 is significantly reduced if the communication monitoring and coping apparatus 20 copes with all security breaches with a low infringement degree, that is, with minor influence on the monitoring target system 1.

When the infringement degree is not high enough to require the coping process (S1001: NO), the coping determination process ends. When the infringement degree is high enough to require the coping process (S1001: YES), the coping process determination unit 22 executes a device search process of searching for a coping target device (proxy device or alternative device) (S1002). Details of the device search process will be described later.

As a processing result of the device search process, the coping process determination unit 22 acquires information on any of processing results of three patterns including (1) switching the coping-required device to the alternative device, (2) switching the coping-required device to the proxy device, and (3) no switching candidate (no switching) as will be described later.

The coping process determination unit 22 executes a process in S1004 to be described later when the processing result is (1) or (2) (S1003: YES), and executes a process in S1005 to be described later when the processing result is neither (1) nor (2) (S1003: NO).

In S1004, the coping process determination unit 22 generates coping information indicating that the coping target device is switched to the proxy device or the alternative device, and the coping determination process ends.

In S1005, the coping process determination unit 22 confirms whether the infringement degree calculated in S903 is high enough to stop the coping-required device. Specifically, the coping process determination unit 22 confirms whether the infringement degree calculated in S903 is "high" or "medium".

When the infringement degree is high enough to stop the coping-required device (S1005: high), the coping process determination unit 22 executes a process in S1007 to be described later. When the infringement degree is not high enough to stop the coping-required device (S1005: middle), the coping process determination unit 22 executes a process in S1006 to be described later.

In S1006, the coping process determination unit 22 generates coping information indicating that a degenerate operation in which the operation is performed by limiting some functions of the coping target device. Thereafter, the coping determination process ends. Note that the functions to be limited may be designated in advance, or may be increased or decreased based on the infringement degree or another information.

In S1007, the coping process determination unit 22 generates coping information indicating that a safe stop is performed in which all the functions of the coping target device are limited, that is, all the functions are stopped to safely control the coping target device into a stop state. This is because it is assumed that the influence on the system and human life increases due to the influence of unauthorized communication. The coping determination process ends as above.

Next, details of the device search process S1002 will be described.

<Device Search Process>

Figure 12:
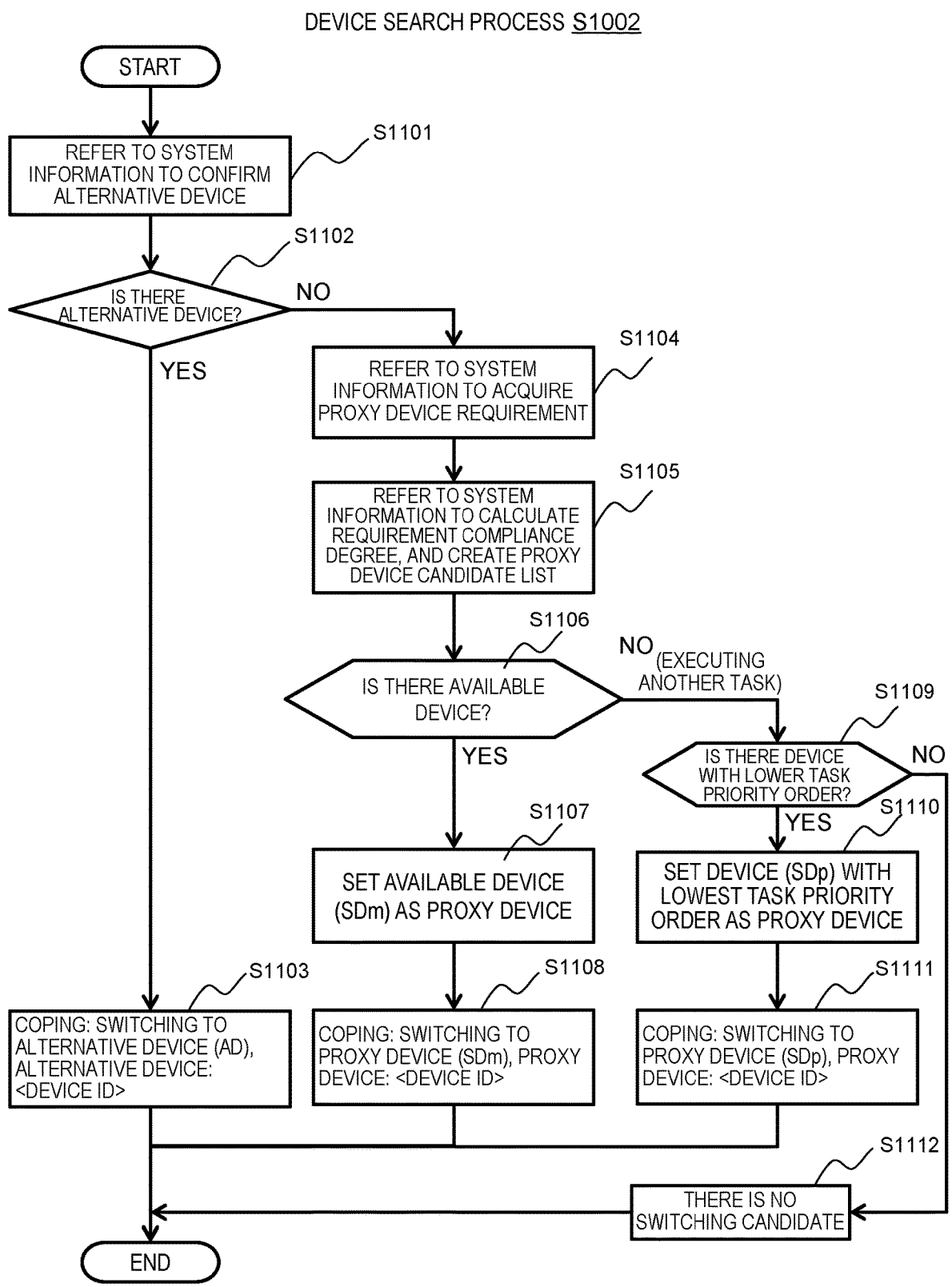
FIG. 12 is a flowchart illustrating an example of a device search process.

FIG. 12 is a flowchart illustrating an example of the device search process.

The coping process determination unit 22 of the communication monitoring and coping apparatus 20 confirms whether there is an alternative device (AD) as a coping target device (S1101 and S1102). Specifically, the coping process determination unit 22 confirms presence or absence of data of the alternative device 504 in a record in the device information table 201 in which a device ID of the coping target device is set to the device ID 501.

When the alternative device (AD) is present as the coping target device (S1102: YES), the coping process determination unit 22 executes a process in S1103 to be described later. When there is no alternative device (AD) as the coping target device (S1102: NO), the coping process determination unit 22 executes a process in S1104 to be described later.

In S1103, the coping process determination unit 22 selects the AD as the coping target device, and further sets "Coping: Switching to alternative device, Alternative device: <Device ID>" as a coping process ((1) switching the coping-required device to the alternative device). Note that <Device ID> is a device ID of the AD acquired from the device information table 201.

In a case where there are a plurality of alternative devices, the coping process determination unit 22 may select, for example, a device having the highest performance indicated by the device specification 506 based on the device information table 201, may cause the plurality of alternative devices to perform coping processes in parallel, or may cause the user to select one alternative device. The device search process ends as above.

In S1104, the coping process determination unit 22 acquires a requirement of an execution environment of a control logic program and a control command requested as a proxy device. Specifically, the coping process determination unit 22 acquires the requirement 507 of the device information table 201 in which the device ID of the coping target device is set to the device ID 501.

The coping process determination unit 22 identifies all devices satisfying the device requirement acquired in S1104

(S1105). For example, the coping process determination unit 22 compares each item of a requirement of each device with each item of the device requirement acquired in S1104 to identify all the devices satisfying all the items of the device requirement and generate a device list.

Here, the coping process determination unit 22 confirms whether there is a device (SDm) that is not currently performing a process (task) in the device list based on each of the device information tables 201 (S1106). Specifically, the coping process determination unit 22 acquires the device ID 501 of a record in which "none" is set to the task ID 508 in the device information table 201, and confirms whether this device is included in the device list.

When there is the SDm (S1106: YES), the coping process determination unit 22 executes a process in S1107 to be described later. When there is no SDm (S1106: NO), the coping process determination unit 22 executes a process in S1109 to be described later.

In S1107, the coping process determination unit 22 selects the SDm as the proxy device, and further sets "Coping: Switching to proxy device, Proxy device: <Device ID>" as a coping process ((2) Switching the coping-required device to the proxy device) (S1108). Note that <Device ID> is a device ID of the SDm acquired from the device information table 201.

In a case where there are a plurality of SDm's, the coping process determination unit 22 may select, for example, an SDm having the highest performance indicated by the device specification 506 based on the device information table 201, may cause the plurality of SDm's to perform coping processes in parallel, or may cause the user to select one SDm. The device search process ends as above.

In S1109, the coping process determination unit 22 determines whether there is a device (SDp) performing a task (process) with a lower priority order than a task that the coping-required device is in charge of (when tasks are assigned to all the devices in the device list).

Specifically, the coping process determination unit 22 determines whether there is an SDp by referring to the priority order column 704 of each record of the task information table 203.

When there is no SDp (S1109: NO), the coping process determination unit 22 sets "Coping: No switching candidate" as a coping process ((3) No switching candidate) (S1112). The device search process ends as above.

When there is the SDp (S1109: NO), the coping process determination unit 22 selects the SDp as the proxy device (S1110) and further sets "Coping: Switching to proxy device, Proxy device: <Device ID>" as a coping process (S1111). Note that <Device ID> is a device ID of the SDp acquired from the device information table 201.

In a case where there are a plurality of SDp's, the coping process determination unit 22 may select, for example, an SDp having the highest performance indicated by the device specification 506 based on the device information table 201, may cause the plurality of SDp's to perform coping processes in parallel, or may cause the user to select one SDp. The device search process ends as above.

In this manner, the communication monitoring and coping apparatus 20 can cope in consideration of the availability and safety of the monitoring target system 1 by switching the coping-required device in which the unauthorized communication (security breach) has occurred to the alternative device.

In addition, when there is no alternative device, the communication monitoring and coping apparatus 20 can obtain an effect equivalent to that in the case of switching to the alternative device by searching for a proxy device that is substitutable in the monitoring target system 1 and switching to the proxy device. In this case, when a candidate for the proxy device is used for a task, the communication monitoring and coping apparatus 20 compares a priority of a task that the coping-required device suffering a security breach with a priority of the task that the candidate device is in charge of, and stops the task (process) related to the candidate device to use the candidate device as the proxy device of the coping-required device if the priority of the task of the candidate is lower. As a result, it is possible to preferentially continue a highly necessary task in the monitoring target system 1.

That is, the communication monitoring and coping system 5 of the present embodiment identifies the coping-required device involved in the unauthorized communication in the monitoring target system 1, that is, the unauthorized communication in the first network 110 and the second network 120 connected to the plurality of devices (the management apparatus 10, the controllers 11, and the actuators 12) to communicate with each other, searches for the coping target device that substitutes for the coping-required device and generates the coping information based on the information on the network and the information on the respective processes of the respective devices, and transmits the generated coping information to the coping execution apparatus 30. As a result, it is possible to take a measure ensuring the availability and safety for the monitoring target system 1 in which the unauthorized communication has occurred.

The present invention is not limited to the above-described embodiment, and includes various modifications. The above-described embodiment has been described in detail in order to facilitate understanding of the present invention, and the invention is not necessarily limited to include the entire configuration described above.

For example, information used by the communication monitoring and coping apparatus 20 in the present embodiment does not depend on a data structure and may be expressed by any data structure. Although the example in which information is stored in a table format has been described in the present embodiment, the information may be stored in a data structure appropriately selected from a list, a database, or a queue, for example.

In addition, the respective functional units included in the communication monitoring and coping apparatus 20 and the coping execution apparatus 30 may be further divided into a plurality of functional units, or a part of each of the functions may be integrated.

In addition, the communication monitoring and coping system 5 of the present embodiment monitors and copes with the unauthorized communication in the respective devices of the management apparatus 10, the controller 11, and the actuator 12, but may monitor and cope with the unauthorized communication only for a device selected from these devices.

The communication monitoring and coping apparatus 20 detects the unauthorized communication based on the IP address, the port number, and the like in the present embodiment, but may detect the unauthorized communication using other packet information or information on a communication state of each device.

In the present embodiment, the communication monitoring and coping apparatus 20 adopts the infringement degree based on the influence degree and the unauthorized communication rate as the parameter indicating the magnitude of influence of the unauthorized communication on the monitoring target system 1. However, a method for calculating the infringement degree is not limited to the method described in the present embodiment, and parameters other than the infringement degree may be used.

Although the case where the communication monitoring and coping apparatus 20 uses the alternative device and the proxy device as the coping target device performing a process in place of the coping-required device has been described in the present embodiment, only one of the alternative device and the proxy device may be used.

Although the case in which the communication monitoring and coping apparatus 20 performs processing according to the infringement degree, that is, causes the coping-required device to perform the degenerate operation if the infringement degree is "high" and performs the process of stopping the operation of the coping-required device if the infringement degree is "medium" when failing to search for the coping target device has been described in the present embodiment, but other modes may be adopted. For example, the communication monitoring and coping apparatus 20 may advance the degenerate operation stepwise in accordance with the magnitude of the infringement degree.

At least the following matters will be clarified by the above description of the present specification. That is, in the present embodiment, the coping process determination unit of the communication monitoring and coping apparatus 20 may be configured to determine whether a second device has been searched for and to generate information indicating that the identified device limitedly executes a process as the coping information when the second device has not been searched for.

In this manner, when the coping target device has not been searched for, the coping information indicating that the coping-required device limitedly executes the process is generated, so that the influence on the monitoring target system 1 can be minimized even in a case where there is no appropriate alternative device.

In the present embodiment, the coping process determination unit of the communication monitoring and coping apparatus 20 may be configured to determine whether the second device has been searched for, and calculates strength of the detected unauthorized communication when the second device has not been searched for and to generate, as the coping information, information indicating that a process performed by the identified device is limitedly executed in accordance with the calculated strength of the unauthorized communication. Note that the term "limit" as used herein includes a case of partial limit and a case of full limit (entire function stop).

Since the coping information indicating that the process performed by the coping-required device is limitedly executed in accordance with the strength of tampering of the unauthorized communication is generated when the coping target device has not been searched for in this manner, it is possible to take necessary and sufficient measures according to a mode of the security breach.

In the present embodiment, the communication monitoring and coping apparatus 20 may include the system information management unit that stores a correspondence relationship between a device in the network and an alternative device substitutable for the device, and the coping process determination unit may be configured to determine whether there is an alternative device associated with the identified device based on the correspondence relationship, to identify the alternative device as the second device if the alternative device exists, and to search for the second device based on the information on the network and the information on each of the processes performed by the plurality of devices when the alternative device does not exist.

In this manner, an alternative device can identified as the coping target device if the alternative device corresponding to the coping-required device exists, and an optimal device (a device capable of ensuring the availability and safety) based on current network and device situation can be searched for by searching for the coping target device based on the information on the network and the information on the respective processes of the respective devices in the system information table 200 if there is no alternative device.

In the present embodiment, the system information management unit of the communication monitoring and coping apparatus 20 may further store information on a priority of the process performed by each of the devices, and the coping process determination unit may be configured to search the information for a third device other than the identified device, which has a priority lower than a priority related to the identified device when the alternative device does not exist, and to generate information indicating that the searched third device is caused to execute a process in place of the identified device when the third device has been searched for.

In this manner, in a case where another device (proxy device), which is a device other than the coping-required device and has a lower priority than a priority of the coping-required device, has been searched for when there is no alternative device, the coping information for executing the proxy device instead of the coping-required device is generated, so that it is possible to minimize the trouble with a task that is being currently performed.

Although the present disclosure has been described with reference to example embodiments, those skilled in the art will recognize that various changes and modifications may be made in form and detail without departing from the spirit and scope of the claimed subject matter.

What is claimed is:

1. A communication monitoring and coping apparatus comprising:
    a communication interface;
    a processor coupled to the communication interface; and
    a memory storing:
    a first table having a plurality of entries, each first entry indicating content of a communication identifier (ID), a communication protocol, a transmission source address, a destination address, a transmission source port ID and a destination port ID stored in association with each other;
    a second table having a plurality a second entries, each second entry indicating a task ID identifying a task, an operation time period of the task, a priority order and two of the communication IDs in the first table; and
    a plurality of control information tables which respectively correspond to one of the communication IDs, each control information table indicates a communication ID, a communication protocol, a control command, a parameter, a communication cycle and an influence degree, the influence degree indicating an importance level of the task associated with the communication ID of the control information table,
    wherein the processor is configured to:
    detect unauthorized communication in a network in which a plurality of devices are connected to communicate with each other by:

acquiring communication packets via the communication interface and generate analysis information based on the acquired packets, determine whether the analysis information matches the content of any of the first entries of the first table, upon determining the analysis information matches the content of any of the first entries of the first table, acquire the communication ID having the matching content and determine whether the communication packet is transmitted or received within the operation time period corresponding to the communication ID, upon determining the communication packet is transmitted or received within the operation time period corresponding to the communication ID, acquires a control information table, among the plurality of control information tables, corresponding to the acquired communication ID and determines whether content of the communication packet conforms with the content of the acquired control information table, upon determining the analysis information does not match the content of any of the first entries of the first table, or upon determining the communication packet is not transmitted or received within the operation time period corresponding to the communication ID, or upon determining the content of the communication packet does not conform with the content of the acquired control information table, identify a device involved in the detected unauthorized communication, search for a second device that is to be a substitute for the identified device, generate coping information, which is information of a process performed instead of the identified device, based on information on the network and information on each of processes performed by the plurality of devices, and transmit the generated coping information to an information processing apparatus that causes the second device to execute the process indicated by the coping information.

2. The communication monitoring and coping apparatus according to claim 1, wherein the processor is configured to determine whether the second device has been found by the search and when the second device is not found, generate information indicating that the identified device executes limited processing as the coping information.

3. The communication monitoring and coping apparatus according to claim 2, wherein the processor is configured to determine whether the second device has been found by the search and when the second device is not found, calculate a strength of tampering of the detected unauthorized communication, and generate, as the coping information, information indicating that a process performed by the identified device executes limited processing in accordance with the calculated strength of tampering of the unauthorized communication.

4. The communication monitoring and coping apparatus according to claim 1, wherein the memory stores a correspondence relationship between each of the devices in the network and each of alternative devices substitutable for the devices, wherein the processor is configured to determine whether there is an alternative device associated with the identified device based on the correspondence relationship, identify the alternative device as the second device if the alternative device exists, and search for the second device based on the information on the network and the information on each of the processes performed by the plurality of devices when the alternative device does not exist.

5. The communication monitoring and coping apparatus according to claim 4, wherein the processor is configured to search the second table for a third device other than the identified device, which has a priority lower than a priority related to the identified device when the alternative device does not exist, and generate information indicating that the searched third device is caused to execute a process in place of the identified device when the third device has been searched for.

6. A communication monitoring and coping method for causing an information processing apparatus having a memory, a processor and a communication interface, to execute steps comprising:

storing a first table having a plurality of entries, each first entry indicating content of a communication identifier (ID), a communication protocol, a transmission source address, a destination address, a transmission source port ID and a destination port ID stored in association with each other;

storing a second table having a plurality a second entries, each second entry indicating a task ID identifying a task, an operation time period of the task, a priority order and two of the communication IDs in the first table;

storing a plurality of control information tables which respectively correspond to one of the communication IDs, each control information table indicates a communication ID, a communication protocol, a control command, a parameter, a communication cycle and an influence degree, the influence degree indicating an importance level of the task associated with the communication ID of the control information table;

detecting unauthorized communication in a network in which a plurality of devices are connected to communicate with each other by:

acquiring communication packets via the communication interface and generate analysis information based on the acquired packets, determine whether the analysis information matches the content of any of the first entries of the first table, upon determining the analysis information matches the content of any of the first entries of the first table, acquire the communication ID having the matching content and determine whether the communication packet is transmitted or received within the operation time period corresponding to the communication ID, upon determining the communication packet is transmitted or received within the operation time period corresponding to the communication ID, acquires a control information table, among the plurality of control information tables, corresponding to the acquired communication ID and determines whether content of the communication packet conforms with the content of the acquired control information table, upon determining the analysis information does not match the content of any of the first entries of the first table, or upon determining the communication packet is not transmitted or received within the operation time period corresponding to the communication ID, or upon determining the content of the communication packet does not conform with the content of the acquired control information table, identify a device involved in the detected unauthorized communication;

searching for a second device that is to be a substitute for the identified device and generating coping information, which is information of a process to be performed instead of the identified device, based on information on the network and information on each of processes performed by the plurality of devices; and transmitting the generated coping information to an information processing apparatus that causes the other device to execute the process indicated by the coping information.

7. A communication monitoring and coping system comprising:

a communication monitoring and coping apparatus including:
a communication interface,
a processor coupled to the communication interface, and
a memory storing:
a first table having a plurality of entries, each first entry indicating content of a communication identifier (ID), a communication protocol, a transmission source address, a destination address, a transmission source port ID and a destination port ID stored in association with each other;

a second table having a plurality a second entries, each second entry indicating a task ID identifying a task, an operation time period of the task, a priority order and two of the communication IDs in the first table; and a plurality of control information tables which respectively correspond to one of the communication IDs, each control information table indicates a communication ID, a communication protocol, a control command, a parameter, a communication cycle and an influence degree, the influence degree indicating an importance level of the task associated with the communication ID of the control information table, wherein the processor is configured to detect unauthorized communication in a network in which a plurality of devices are connected to communicate with each other by:

acquiring communication packets via the communication interface and generate analysis information based on the acquired packets, determine whether the analysis information matches the content of any of the first entries of the first table, upon determining the analysis information matches the content of any of the first entries of the first table, acquire the communication ID having the matching content and determine whether the communication packet is transmitted or received within the operation time period corresponding to the communication ID, upon determining the communication packet is transmitted or received within the operation time period corresponding to the communication ID, acquires a control information table, among the plurality of control information tables, corresponding to the acquired communication ID and determines whether content of the communication packet conforms with the content of the acquired control information table, upon determining the analysis information does not match the content of any of the first entries of the first table, or upon determining the communication packet is not transmitted or received within the operation time period corresponding to the communication ID, or upon determining the content of the communication packet does not conform with the content of the acquired control information table, and identify a device involved in the detected unauthorized communication, search for a second device that is to be a substitute for the identified device, generate coping information, which is information of a process performed instead of the identified device, based on information on the network and information on each of processes performed by the plurality of devices, and transmit the generated coping information to a coping execution processing apparatus that causes the other device to execute the process indicated by the coping information, and wherein the coping execution apparatus includes:
a processor,
a memory,
a communication interface that receives the coping information, and transmits, to the second device, information for causing the second device to execute the process indicated by the coping information based on the received coping information.

* * * * *